United States Patent [19]

Ishikawa et al.

[11] Patent Number: 5,033,825
[45] Date of Patent: Jul. 23, 1991

[54] FERROELECTRIC LIQUID CRYSTAL DISPLAY DEVICE HAVING EQUALIZING MEANS

[75] Inventors: Masahito Ishikawa, Yokosuka; Tomiaki Yamamoto, Chigasaki; Akio Murayama, Kamakura; Shoichi Matsumoto, Yokohama, all of Japan

[73] Assignee: Kabushiki Kaisha Toshiba, Kawasaki, Japan

[21] Appl. No.: 455,002

[22] Filed: Dec. 22, 1989

[30] Foreign Application Priority Data

Dec. 26, 1988 [JP] Japan .................. 63-325891
Jun. 12, 1989 [JP] Japan .................. 1-146883

[51] Int. Cl.⁵ .................................. G02F 1/13
[52] U.S. Cl. .................. 350/339 R; 350/337; 350/350 S
[58] Field of Search ............ 350/350 S, 347 E, 339 R, 350/337

[56] References Cited

U.S. PATENT DOCUMENTS

| 4,711,530 | 12/1987 | Nakanowatari et al. | 350/339 R |
| 4,838,663 | 6/1989 | Lagerwall et al. | 350/350 S |
| 4,844,569 | 7/1989 | Wada et al. | 350/347 E |
| 4,941,736 | 7/1990 | Taniguchi et al. | 350/350 S |

FOREIGN PATENT DOCUMENTS 0219480 4/1987 European Pat. Off. ......... 350/350 S
0306424 12/1988 Japan ................................ 350/

Primary Examiner—Stanley D. Miller
Assistant Examiner—Huy K. Mai
Attorney, Agent, or Firm—Cushman, Darby & Cushman

[57] ABSTRACT

A light crystal cell comprising a pair of substrates arranged substantially parallel and provided with electrodes on their opposite surfaces, and a ferroelectric liquid crystal composition held between these substrates, two polarizers arranged on either side of said liquid crystal cell, and an optical retardation film for equalizing the states of polarization of transmitted light that has passed through parts of said liquid crystal cell of different thickness. It is preferable that this optical retardation film is inserted between the liquid crystal cell and a polarizer. The number of optical retardation films need not however be limited to one, and several such films may be used. A polarizer and optical retardation film may also be assembled as one unit.

5 Claims, 4 Drawing Sheets

FERROELECTRIC LIQUID CRYSTAL DISPLAY DEVICE HAVING EQUALIZING MEANS

BACKGROUND OF THE INVENTION

1. Field of the Invention

This invention concerns a ferroelectric liquid crystal display device, and in particular a liquid crystal display device wherein unevenness of the display color due to non-uniformity of cell thickness, is eliminated.

2. Description of the Related Art

A ferroelectric liquid crystal display device which operates in a new birefringence display mode using a combination of a ferroelectric liquid crystal and polarizers is disclosed in Japanese Unexamined Patent Publication No. 56-107216. This device has the following characteristics:

(1) High speed response (of the order of several tens microseconds),
(2) Memory capability for alignment.

In particular, the memory capability (2) makes possible a high capacity display of over 400 lines without any cross-talk.

We shall describe the principle of ferroelectric liquid crystal display based on the devices of the prior art.

As shown in FIG. 1, a 1st and 2nd polarizer 3 and 4 are arranged respectively on either side of a cell 5 consisting of a liquid crystal composition enclosed between a pair of substrates. When an electric field is applied to this cell 5 in the direction marked 600, the director 500 points in the direction marked 501. When an electric field is applied in the direction marked 601, on the other hand, director 500 points in the direction marked 502. In FIG. 1, the 1st polarizer 3 is arranged such that its polarizing axis 31 is aligned with direction 501, while the 2nd polarizer 4 is aligned such that its polarizing axis 41 is perpendicular to axis 31 of 1st polarizer 3.

We shall now explain the polarization of the light which passes through this liquid crystal display device. First, natural light passes through 1st polarizer 3 and thereby becomes linearly polarized light 103. This light 103 then is incident on the liquid crystal cell 5. When an electric field is applied to cell 5 in the direction marked 600, the director 500 is aligned in the direction 501, and therefore the light 103 passes through cell 5 without any change of polarization. The light 105 which has left cell 5 is therefore linearly polarized. The plane of vibration of this linearly polarized light 105 is mutually perpendicular to polarizing axis 41 of 2nd polarizer 4. As a result, the light 105 is unable to pas through polarizer 4, and the liquid crystal display is then dark. On the other hand, when an electric field is applied to cell 5 in the direction marked 601, the director 500 points in direction 502 The linearly polarized light 103 incident on the cell 5 is thereby generally changed into elliptically polarized light. Thus the light 105 which leaves cell 5 is elliptically polarized light. The result is that part of the light 105 passes through the 2nd polarizer 4, and the liquid crystal display thus appears bright.

In the ferroelectric liquid crystal display, therefore, the orientation of the director is selected by the polarity of the external electric field, and effectively switches the light on and off. This type of method is known as birefringence mode display. In the meantime, we set forth the case where polarizing axis 31 of polarizer 3 is parallel to the orientation of the director of the liquid crystal when a voltage is applied to a liquid crystal cell. However, it is well known that it is not always necessary to arrange the polarizing axis parallel to the orientation of the director.

Now the transmission of the light when the birefringence mode display having the optical arrangement as shown in FIG. 1 appears bright, depends on the product of optical anisotropy of the liquid crystal, $\Delta n$, and the thickness of the liquid crystal layer d (this is known as the retardation value). The light transmission $T(\lambda)$ of the device in the bright condition under the cross-Nicol, is given by the following equation:

$$T(\lambda) = T_0 \cdot \sin^2(\pi \Delta n d / \lambda)$$

where $\lambda$ is the wavelength of the light, and $T_0$ is a constant.

We calculated the dependence of transmission of the liquid crystal cell on cell thickness for the case $\Delta n = 0.14$. FIG. 2 shows the results. In FIG. 2, in the region of a cell thickness of 2 $\mu$m, the transmissivities of red, blue and green light in the transmitted light are nearly 100%, and a white display is therefore obtained. In the region of a cell thickness of 2.2 $\mu$m, however, only a light having wavelength nearer yellow has a higher transmissivity, and the color of the display therefore changes to light yellow. Further, when the cell thickness is in the region of 2.3 $\mu$m, the color of the display becomes light purple.

The color of the display in the bright condition therefore changes considerably for a mere 0.1 $\mu$m variation in cell thickness. In practice, it is recognized that if there is a +0.05 $\mu$m difference in the thickness of a manufactured ferroelectric liquid crystal cell, it will be perceived as an unevenness in the color of the display, and this unevenness is undesirable. To suppress it and render the color uniform, it is thus necessary to control manufacture such that the thickness of the liquid crystal layer (cell thickness) is within a tolerance of +0.05 $\mu$m. Meanwhile, the cell thickness of a ferroelectric liquid crystal device is normally approx. 1–5 $\mu$m. This is very thin in comparison to the cell thickness of 5–8 $\mu$m of the supertwisted liquid crystal display devices which are currently being mass produced, and it is consequently very difficult to control the thickness of the layer such that it is within a tolerance of +0.05 $\mu$m over the whole surface of the liquid crystal panel.

SUMMARY OF THE INVENTION

The object of this invention is to provide a ferroelectric liquid crystal device wherein local unevenness of the display color due to non-uniformity of cell thickness does not appear, wherein the display can be easily read, and wherein the display is of high quality.

The above objectives are achieved by a liquid crystal cell comprising a pair of substrates arranged substantially parallel and provided with electrodes on their opposite surfaces and a ferroelectric liquid crystal substance enclosed between them, two polarizers being arranged respectively on either side of said cell, and a means of practically adjusting the polarization of light which has passed through the cell to be the same regardless of the fact that it may have passed through parts of the cell of different thickness.

DETAILED DESCRIPTION OF THE PREFERRED EMBODIMENTS

Figure 3:
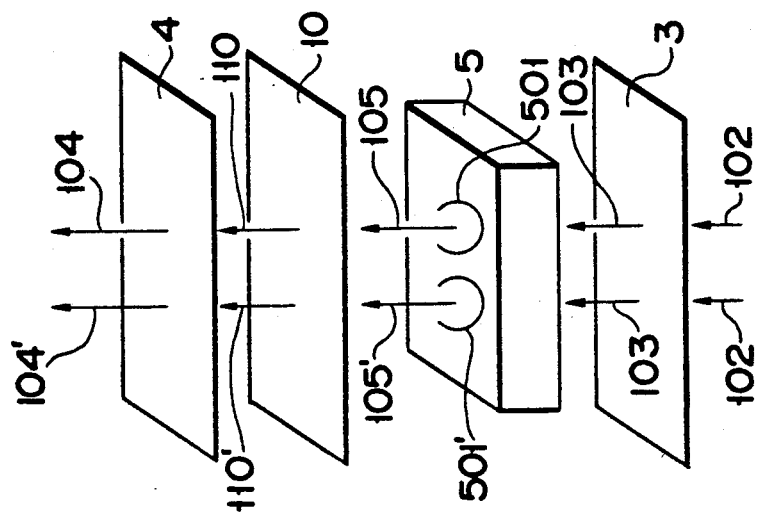
FIG. 3 is an exploded perspective view schematically showing one embodiment of the ferroelectric liquid crystal display device according to this invention.

FIG. 3 is an exploded perspective view of one embodiment of the ferroelectric liquid crystal display device according to this invention. In FIG. 3, a 1st polarizer 3 and a 2nd polarizer 4 are arranged on either side of the ferroelectric liquid crystal cell 5, and in addition, an optical retardation film 10 is arranged between cell 5 and 2nd polarizer 4. This optical retardation film 10 substantially equalizes the states of polarization of transmitted light which has passed through different thicknesses of the liquid crystal cell.

We shall now describe the state of polarization of the light transmitted by the liquid crystal display device. As shown by FIG. 3, white light 102 incident on the device passes through 1st polarizer 3 and thereby becomes linearly polarized light 103. This linearly polarized light 103 then impinges on cell 5. When it passes through cell 5, the linearly polarized light is converted to elliptically polarized light. The polarization state of this elliptically polarized light depends on the thickness of the liquid crystal cell. The light 105 and 105' which passed through regions of the cell of different thickness 501 and 501' respectively, therefore, has different polarizations. This difference of polarization is the reason for the unevenness in the color of the display in conventional ferroelectric liquid crystal devices. In the liquid crystal device according to this invention shown in FIG. 3, however, the elliptically polarized light 105 and 105' which has passed through cell 5, impinges on optical retardation film 10. This incident light is converted into elliptically polarized light and emerges from optical retardation film 10 as elliptically polarized light 110 and 110'. The retardation value of the film and the alignment of its optical axis are set beforehand, this setting being such that the state of polarization of light 110 and 110', that is the ellipticity and direction of the elliptic axis, is substantially the same in both cases. Finally, light 110 and 110' impinges on the 2nd polarizer 4, and part of it emerges from the liquid crystal device as linearly polarized light 104 and 104'. Due to the effect of retardation film 10 as described above, the state of polarization of light 110 and 110' is substantially the same, and although it has passed through parts of the cell of different thickness, no color difference arises between light 104 and 104'. In this way, in the ferroelectric liquid crystal display device of this invention, it is possible to obtain a display without unevenness of color.

In the ferroelectric liquid crystal device of this invention, the optical retardation film need not be placed between the liquid crystal cell and the 2nd polarizer, and can be placed between the cell and the 1st polarize provided that the light which has travelled through different cell thicknesses has substantially the same polarization before it impinges on the 2nd polarizer. Further, in the ferroelectric liquid crystal device of this invention, the number of optical retardation films need not be limited to 1, and several films may be used under the same conditions as above. Further, several films may also be installed simultaneously between the 2nd polarizer and the liquid crystal cell, and between the 1st polarizer and the cell.

Further, in the ferroelectric liquid crystal display device of this invention, it is preferable that the opposite surfaces of the 2 substrates that constitute the liquid crystal cell, are treated beforehand by means of a known technique such as rubbing, for example. It is then possible to specify the axial alignment of the liquid crystal molecules in the vicinity of the substrate.

We shall now describe some embodiments of this invention.

EXAMPLE 1

Figure 1:
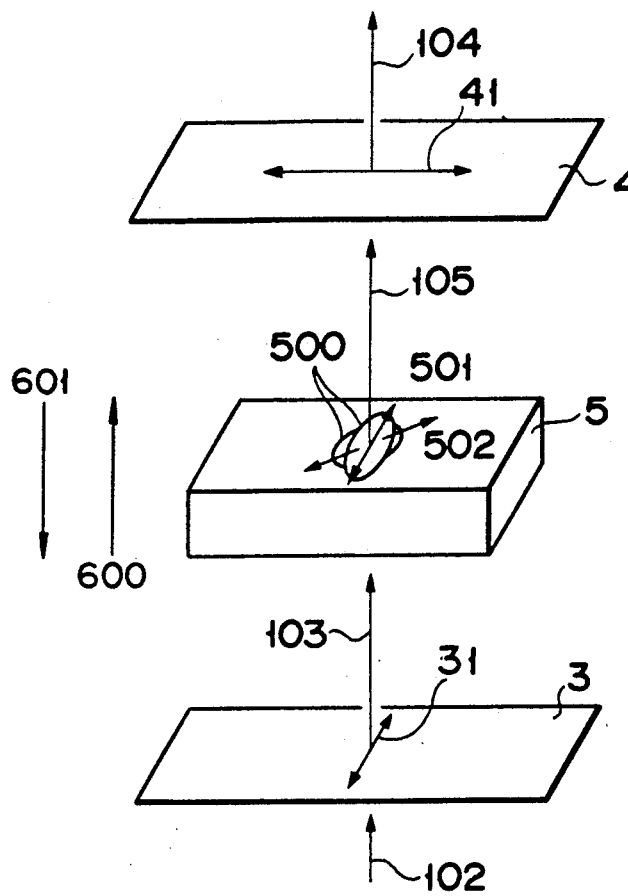
FIG. 1 is a view explaining the principle of the display of a ferroelectric liquid crystal display device.
Figure 2:
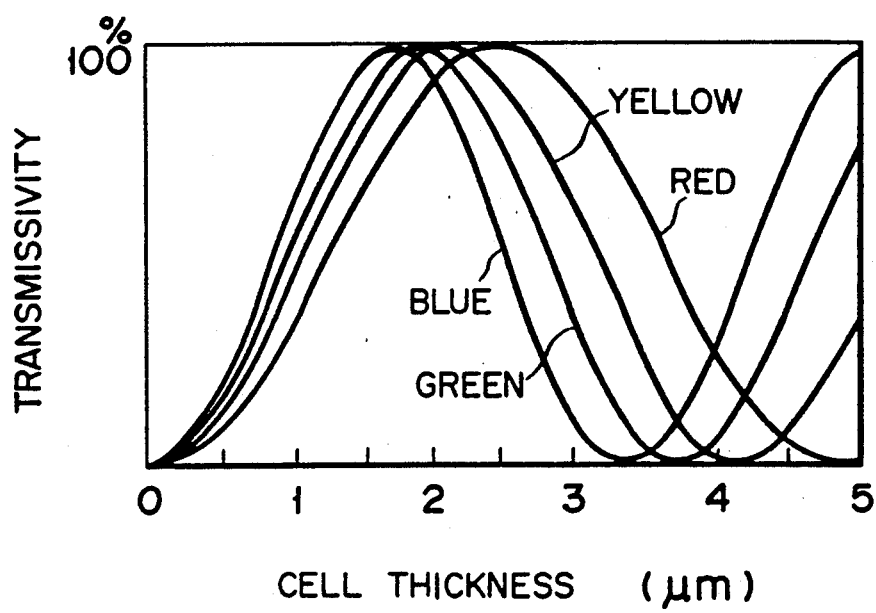
FIG. 2 is a graph showing the results of a theoretical calculation of the dependence of transmissivity of incident light on cell thickness for several wavelengths in a ferroelectric liquid crystal cell.
Figure 4:
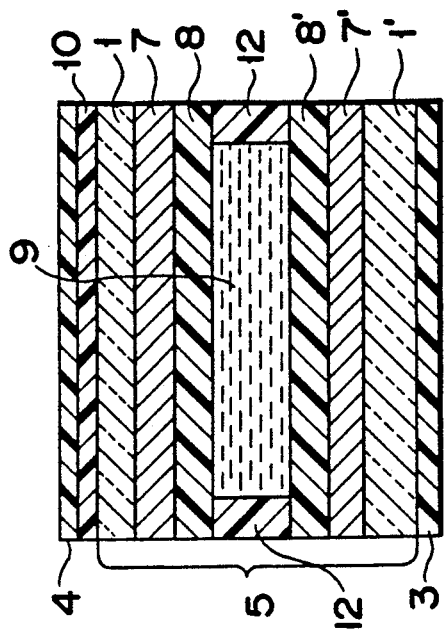
FIG. 4 is a sectional view of the ferroelectric liquid crystal display device in FIG. 3.

A ferroelectric liquid crystal device with a section as shown in FIG. 4, was assembled. In this device, polarizers 3 and 4 were installed on either side of liquid crystal cell 5, and an optical retardation film 10 was inserted between cell 5 and polarizer 4.

On the surfaces of cell 5, there are substrates 1 and 1' upon which are formed transparent electrodes 7 and 7', and polyimide alignment films 8 and 8' which have undergone rubbing as an alignment treatment. These substrates 1 and 1' are arranged such that the surfaces on which the electrodes and the alignment films are formed face each other, and such that they are substantially parallel. To maintain the distance between substrates 1 and 1' effectively constant, Micropearl Spacer (Sekisui Fine Chemicals Inc.) of diameter 3 μm are used as spacers. Further, substrate 1 and 1' are arranged such that the rubbing directions of alignment films 8 and 8' formed on each of them are the same. The surrounds of substrate 1 and 1' so arranged are fixed by an epoxy resin sealing agent 12, and a ferroelectric liquid crystal composition 9 is enclosed between substrate 1 and 1'. In this example, ZLI-3488 (MERCK Inc.) was used as the composition 9.

In this example, the size of the liquid crystal cell thus prepared was 200 mm×300 mm. The thickness of this cell varied at different points, and lay within the range 2.9 μm–3.1 μm.

Figure 5:
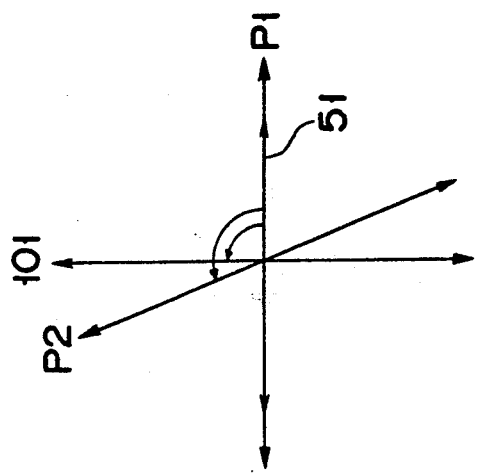
FIG. 5 is a view showing the relation between the rubbing direction of the alignment films in the cell, the polarizing axes of the 1st and 2nd polarizers, and the stretching direction of the optical retardation film, in the ferroelectric liquid crystal display device of FIG. 3.

1st and 2nd polarizers 3 and 4 were arranged on either side of this cell 5, the arrangement being such that the angle made by the polarization axis $P_1$ of polarizer 3, and the angle made by the polarization axis $P_2$ of polarizer 4, were 0° and 110° respectively with respect to the rubbing direction 51 of the alignment films as shown in FIG. 5. In this example, LLC-2-81-18 (Sanritsu Denki Inc.) was used as polarizers 3 and 4.

An optical retardation film 10 consisting of a polyvinyl alcohol (PVA) stretched in one direction and having a retardation value of 0.3 μm, was interposed between cell 5 and 2nd polarizer 4. The stretching direction 101 of the film 10, as shown in FIG. 5, makes an angle of 90° with respect to the rubbing direction 51 of the alignment films.

Figure 6:
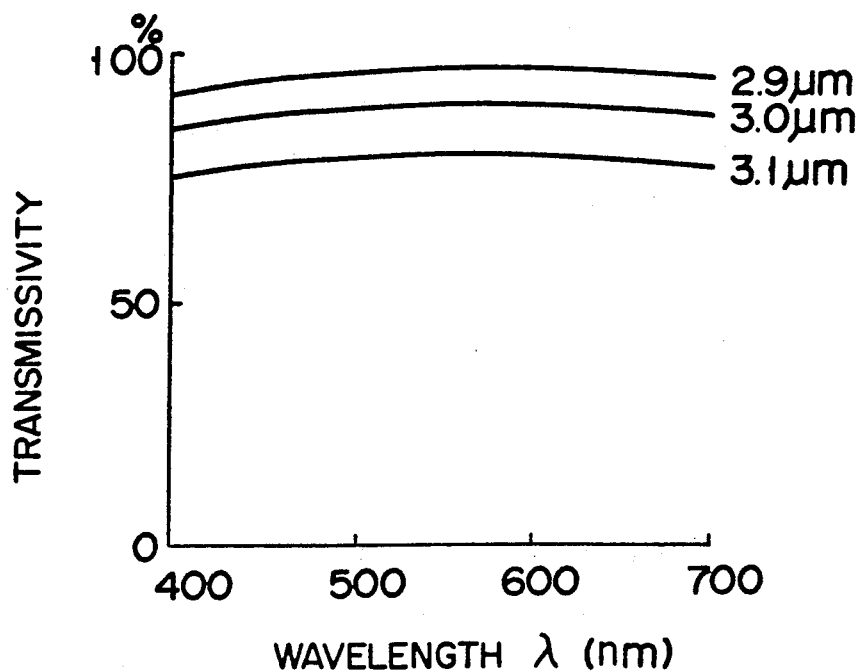
FIG. 6 is a graph showing the relation between light wavelength and transmissivity in the ferroelectric liquid crystal display device in FIG. 3, for several cell thicknesses.

Varying the thickness of the cell in this liquid crystal display device, the correlation between wavelength and transmissivity of the transmitted light in the bright condition was investigated for different cell thicknesses. FIG. 6 shows the results. In FIG. 6, the wavelength of the light is shown on the abscissa, and transmissivity of the light on the ordinate. As can be seen from FIG. 6, the transmissivity was substantially independent of wavelength and constant for each cell thickness. In other words, differences in cell thickness do not appear as unevenness of color but as differences of light and dark, and they are practically imperceptible to the eye.

Further, even when the liquid crystal device was multiplex-driven at a 1/400 duty, unevenness of color due to differences of cell thickness did not constitute a problem in practice, and a highly legible, high quality black display on an even white background was obtained. The contrast ratio was 10:1.

EXAMPLE 2

A liquid crystal display device was assembled in the same way as in Example 1, except that the angle made by the polarizing axis $P_2$ of 2nd polarizer 4 with respect to rubbing direction 51 of the alignment films was 75°. Even when this device was driven as in Example 1, there was no coloration due to differences in cell thickness. The display obtained was a highly legible, high quality colorless display on a black background with very little perceptible unevenness. The contrast ratio was 10:1.

COMPARATIVE EXAMPLE

Figure 7:
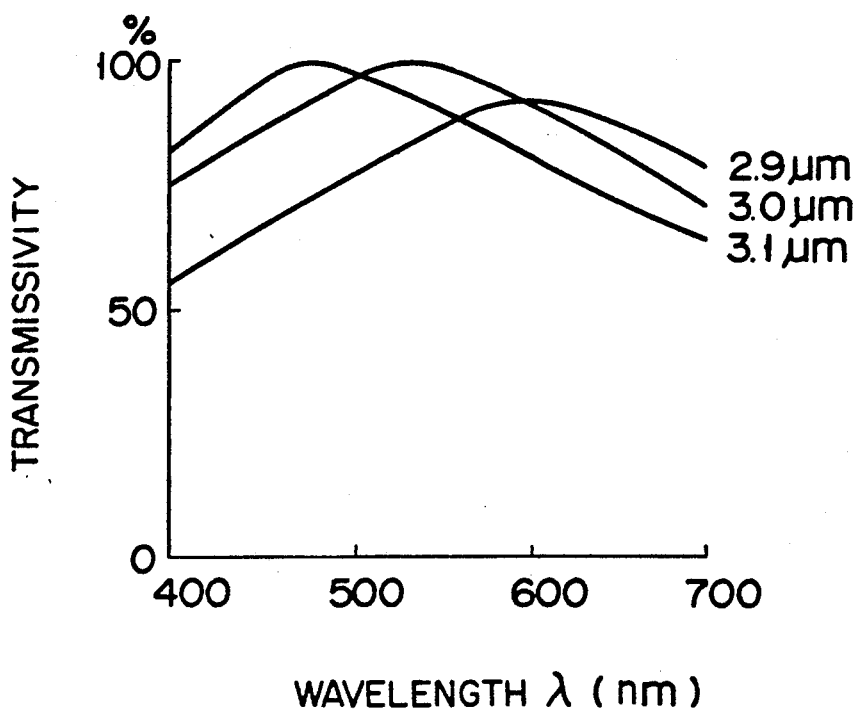
FIG. 7 is a graph showing the relation between light wavelength and transmissivity in the ferroelectric liquid crystal display device of the comparative example, for several cell thicknesses.

The correlation between wavelength and transmissivity of transmitted light was investigated in the bright condition for a liquid crystal display device having the same structure as that of Example 1, excepting that the optical retardation film 10 was absent. FIG. 7 shows the results. The angle made by the polarizing axis $P_1$ of 1st polarizer 3 and rubbing direction 51 of the alignment films was 11°, while the angle made by the polarizing axis $P_2$ of 2nd polarizer 4 and rubbing direction 51 was 77°.

As can be seen from FIG. 7, the peak of transmissivity varies with cell thickness. Where the cell thickness was 2.9 μm, the transmitted light was light yellow; where the cell thickness was 3.0 μm, the light was blue; and where the cell thickness was 3.1 μm, the light was light purple. These differences appeared as unevenness of color on the screen, and led to a remarkable decrease of display quality.

EXAMPLE 3

Figure 8:
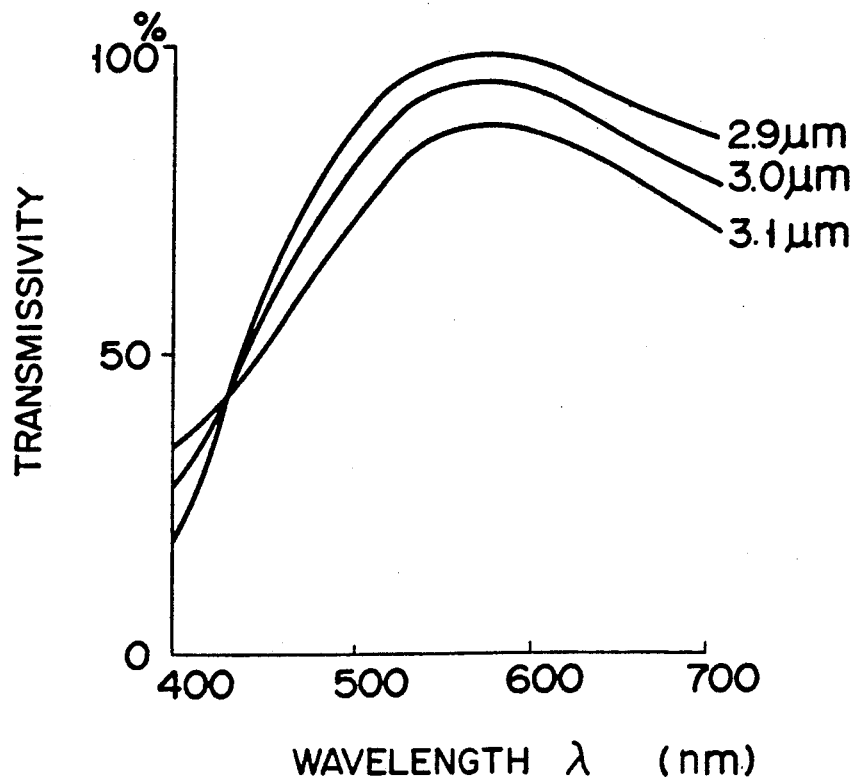
FIG. 8 is a graph showing the relation between light wavelength and transmissivity in another embodiment of the ferroelectric liquid crystal display device of this invention, for several cell thicknesses.

A liquid crystal display device was assembled as in Example 1 wherein the retardation value of the optical retardation film was 0.14 μm, however the arrangement was such that the stretching direction 101 of the alignment film made an angle of 152° with respect to rubbing direction 51. Using this device, the spectral characteristics of transmitted light were measured for different cell thicknesses. FIG. 8 shows the results. In parts where there was a difference in cell thickness, there were different colors in the Comparative Example which appeared as an unevenness of color. As is clear from FIG. 8, however, insertion of the optical retardation film caused this unevenness to change into light and dark variations of light green, thereby giving a highly legible bright display. When the device was multiplex-driven at a 1/400 duty, a highly legible, high quality display of white on a light green background was obtained. The contrast ratio was 8:1.

EXAMPLE 4

Figure 9:
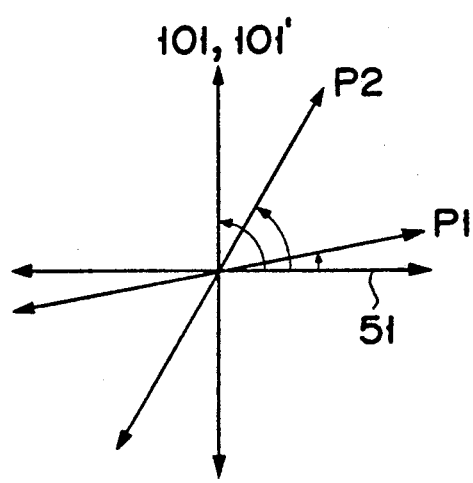
FIG. 9 is a view showing the relation between the rubbing direction of the alignment films in the cell, the polarizing axes of the 1st and 2nd polarizers, and the stretching direction of the optical retardation films in the ferroelectric liquid crystal display device of another embodiment of this invention.

A liquid crystal display device was assembled as in Example 1, excepting that an optical retardation film 10' was also inserted between substrate 1' of the liquid crystal cell and polarizer 3. The retardation values of the films 10 and 10' were both 0.147 μm. In this device, as shown in FIG. 9, the arrangement was such that the rubbing direction 51 of the alignment films made an angle of 90° with stretching direction 101 of optical retardation film 10 and stretching direction 101' of optical retardation film 101'. Further, the arrangement was such that the rubbing direction 51 of the alignment films made an angle of 5° with the polarizing axis $P_1$ of the 1st polarizer 3, and 70° with the polarizing axis $P_2$ of 2nd polarizer 4.

When the device was multiplex-driven as in Example 1, there was no unevenness of color due to differences of cell thickness, and a highly legible, high quality display was obtained. The background when this device was being driven was light yellow, and the displayed matter was black. The contrast ratio was 9:1.

EXAMPLE 5

Figure 10:
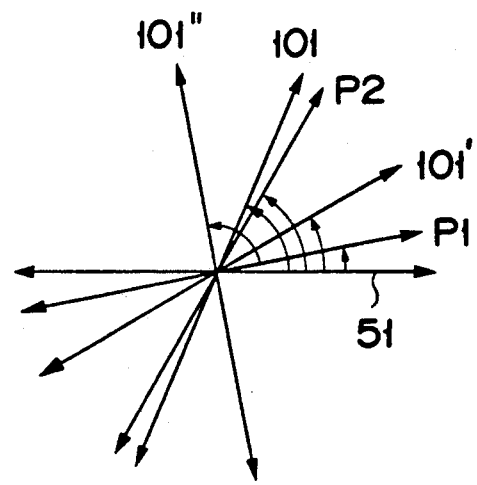
FIG. 10 is a view showing the relation between the rubbing direction of the alignment films in the cell, the polarizing axes of the 1st and 2nd polarizers, and the stretching direction of the optical retardation films in the ferroelectric liquid crystal display device of a further embodiment of this invention.

A liquid crystal display device was assembled as in Example 1, excepting that optical retardation films 10, 10' and 10" were inserted in sequence between substrate 1 of liquid crystal cell 5 and 2nd polarizer 4 starting from the substrate 1 side. As shown in FIG. 10, said optical retardation films 10, 10' and 10" were arranged such that their stretching directions 101, 101' and 101" made angles of 72°, 30° and 98° respectively with rubbing direction 51 of the alignment films. The retardation values of the optical retardation films 10, 10' and 10" were 0.253 μm, 0.365 μm and 0.3 μm respectively. Further, in the device of this example, the angle made by the rubbing direction 51 of the alignment films with polarizing axis $P_1$ of 1st polarizer 3 was arranged to be 5°, and the angle made with polarizing axis $P_2$ of 2nd polarizer 4 was arranged to be 70°.

When this liquid crystal display device was multiplex-driven at 1/400 duty, there was no color unevenness sufficient to cause any problem in use, and a highly legible, high quality display was obtained. The display was black on a light blue-green background, and the contrast ratio was 8:1.

EXAMPLE 6

In place of 2nd polarizer 4 and optical retardation film 10 in Example 1, an assembly comprising a polarizing layer of stretched PVA impregnated with iodine and an adjacent layer of stretched PVA, the two layers being enclosed by a protective film of tetraacetyl cellulose, was used.

When this liquid crystal device was driven, a highly legible, high quality display with no color unevenness sufficient to cause any problem in use, was obtained. The display was black on a white background, and the contrast ratio was 10:1.

What is claimed is:

1. A ferroelectric liquid crystal display device, comprising:
    a liquid crystal cell containing a pair of substrates arranged substantially parallel and provided with electrodes on their opposite surfaces, and a ferroelectric liquid crystal composition held between these substrates,
    two polarizers arranged on either side of said liquid crystal cell, and
    a means of equalizing the states of polarization of transmitted light that has passed through parts of said liquid crystal cell of different thickness.

2. A liquid crystal display device according to claim 1, wherein said equalization means is inserted between said liquid crystal cell and either one of said polarizers.

3. A liquid crystal display device according to claim 1 or 2, wherein said equalization means is an optical retardation film.

4. A liquid crystal display device according to claim 3, wherein the thickness of said liquid crystal cell is from 1 μm to 5 μm.

5. A liquid crystal display device according to claim 3, wherein said optical retardation film and the adjacent polarizer are assembled as one unit.

* * * * *